United States Patent Office 3,746,636
Patented July 17, 1973

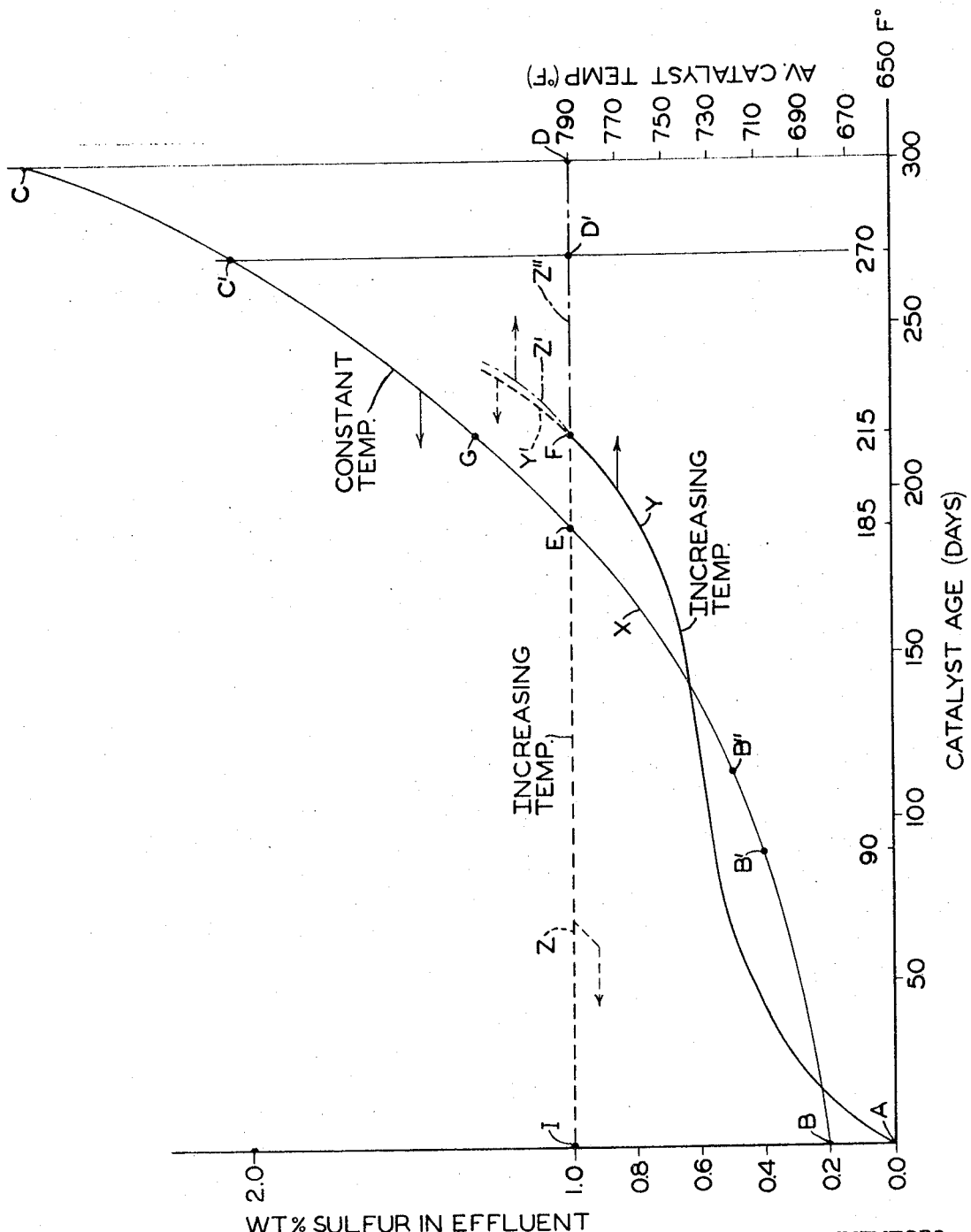

3,746,636
DESULFURIZATION OF CRUDE AND RESIDUAL
OILS AT CONTANT TEMPERATURE
John A. Paraskos and Allen E. Somers, Pittsburgh, Pa.,
assignors to Gulf Research & Development Company,
Pittsburgh, Pa.
Filed Dec. 30, 1970, Ser. No. 102,716
Int. Cl. C10g 23/02
U.S. Cl. 208—216
9 Claims

ABSTRACT OF THE DISCLOSURE

A process for hydrodesulfurizing a crude oil or a residual oil comprises passing the oil over a hydrodesulfurization catalyst to achieve a desired degree of sulfur in the effluent product. A substantially constant temperature with varying effluent sulfur level is maintained during the process such that more than the desired degree of sulfur removal is achieved during at least a portion of the duration of the process.

---

The present invention relates to a process for the hydrodesulfurization (HDS) of a crude oil or a reduced crude oil using an HDS catalyst. The life of the HDS catalyst is extended considerably in accordance with the present invention by operating at least a portion, which may be a major portion, or all of the catalyst cycle at a constant temperature, which may be near a constraint temperature of the reactor system. The process utilizes an HDS catalyst comprising a supported Group VI and Group VIII metal which is advantageously of a small particle size.

Although nickel-cobalt-molybdenum is a preferred active metal combination for the HDS catalyst of the invention, other combinations can be utilized such as cobalt-molybdenum, nickel-tungsten, and nickel-molybdenum. Alumina is a preferred supporting material but other non-cracking supports can also be used. Suitable examples of such catalysts are disclosed in Ser. No. 770,625; filed Oct. 25, 1968, now Pat. 3,562,800.

In the hydrodesulfurization process a crude oil or a reduced or residual fraction is treated to reduce the sulfur content thereof to stipulated levels, for the purpose of minimizing air pollution and for other purposes. Crude or residual oils are difficult to desulfurize because they contain the heavier molecules in which is concentrated nearly the entire metals impurity of the oil. Ironically, sulfur removal does not deactivate the HDS catalyst as the sulfur is usually evolved as gaseous hydrogen sulfide. However, the metals impurity, which comprises primarily nickel and vanadium, does deactivate the catalyst because the metals are increasingly depositioned on the active catalyst surfaces. Unfortunately the HDS catalyst has a greater activity for metals removal than for sulfur removal.

As the catalyst ages the operating temperature required to remove a given percentage of sulfur also increases. This increase in operating temperature results from the grandual reduction in active catalyst area owing to metals deposition. Eventually a point is reached where the requisite operating temperature is so high that the catalyst must be discarded. By way of background to the present invention, then, it is to be noted that the HDS catalyst has a predeterminable life cycle in the HDS process and that the lift of the catalyst is determined not by the sulfur activity of the catalyst but rather by its metals activity. The removed metals adhere permanently to the active catalyst surfaces, which precludes any regeneration of the catalyst. Thus, the catalyst material can be employed for one process cycle and thereafter is discarded. The materials and labor costs in replacing the catalyst together with the attendant loss in production, therefore, must be balanced against the cost of enlarging the reaction vessel and associated apparatus entailed in carrying out the process.

There is, however, another consideration which limits the age of the catalyst cycle in conventional HDS processes, and this consideration assumes a more critical role as a result of discoveries underlying the invention. It is known that as the catalyst progressively absorbs metals from the crude or reduced oil, the temperature which must be maintained in the system for adequate sulfur removal must be increased. As it is also known, the rate of temperature increase is more rapid near the beginning and end of the catalyst cycle, and less rapid at the intermediate stages. The rising rate of temperature increase near the end of the HDS cycle would appear to foreshorten the cycle life of the catalyst, but there are additional considerations as noted below.

The HDS process is carried out at rather high hydrogen partial pressures approaching 2000 p.s.i. in order to reduce somewhat the high initial temperatures that must be employed in the hydrosulfurization of crude or reduced oil. Although the hydrogen partial pressure drops slightly during the process cycle, an increased temperature is encountered as noted above.

The high pressure requirement imparts a rigid upper temperature constraint in the HDS reactor. In an hydrogen-orientated process, hydrogen embrittlement of the metals from which the reactor is fabricated is likely to occur at these high pressures. Furthermore, as the reaction temperature increases with catalyst age to a particular level in the presence of high pressure hydrogen, dangerous fatigue strains are induced in the reactor metal. The temperature at which this fatigue effect becomes ominous will depend upon the quality and thickness of the steel or other structural metal used in the walls of the reaction vessel. In high pressure commercial HDS reactors, this fatigue effect imposes a process temperature constraint of about 790° F.

Heretofore, the HDS process was initiated at the lowest possible temperature (about 700° F.) required to reduce the feed sulfur level to the desired effluent sulfur level. The space velocity of the reactants was maximized consistent with minimization of the reactor size and volume. The reactor temperature was gradually increased throughout the process cycle to compensate for catalyst aging owing to metals deposition, until the upper temperature constraint of about 790° F. is attained. Because of the aforementioned rising rate of temperature increase at this point, the catalyst was considered heretofore to be deactivated at the reactor fatigue constraint temperature. The reactor, therefore, is shut down at this point, and the catalyst is discarded.

It has been discovered in accordance with the present invention that the HDS catalyst is not in fact deactivated at the aforementioned constraint temperature, which has been established solely from a consideration of reactor metals fatigue. This unexpected discovery of extendable catalyst life, has been heretofore obscured by the aforementioned rising rate of temperature increased toward what is believed to have been the end of the catalyst cycle, and by the normal assumption that such rising rate harbingered a rapidly approaching, total deactivation of the catalyst.

It has now been found that at the metal fatigue temperature, much of the catalyst surface is still free of metals so that the catalyst is capable of removing the same amount of sulfur from the feed if a higher temperature could be tolerated, or the catalyst could remove a smaller amount of sulfur than that prescribed for the process at the same temperature. However, in most cases the effluent sulfur level cannot be arbitrarily increased nor can the temperature at which the reactor metal fatigue becomes dangerous be disregarded.

The unexpected realization that the HDS catalyst is capable of extended life beyond that represented by the conventional HDS process cycle has led to further and unexpected discoveries. In further accordance with the present invention it has been found that the life of the HDS catalyst can be prolonged considerably by operating the HDS process with an essentially constant operating temperature. Previously, it was considered that a variable temperature was essential to the proper execution of the HDS process. This was thought to be necessary in order to ensure a predetermined sulfur content in the effluent oil. Instead of varying the operating temperature (usually from about 650 or 700 to about 790° F. in reducing the sulfur from 4 percent to 1 percent) and holding the sulfur level constant in the effluent oil, it has now been discovered that the catalyst cycle life can be unexpectedly prolonged by operating the catalyst at a constant temperature throughout most or all its useful life while permitting the effluent sulfur level to vary. In accordance with the invention the operating temperature should be as high as practicable throughout the life of the catalyst, and considering the aforementioned reactor fatigue considerations, the HDS process is advantageously operated at or near the constraint temperature throughout the entire operation. By commencing the operation at or near the constraint temperature a very low sulfur content is attained in the effluent oil in the initial stages of the process. Thereafter the sulfur level is permitted to increase throughout the catalyst cycle while holding the process temperature at the aforementioned constrain temperature. This can be accomplished without any danger of temperature runaway, since cool hydrogen quench is injected into the reactor.

Operation of the HDS process in this fashion produces a number of advantageous results. In the first instance the initial sulfur level of the effluent oil is depressed to a considerable degree, for example to about 20 percent of that achieved by a conventional HDS process employing a similar charge stock. Assuming a feed oil containing about 4 percent sulfur in each case a conventional HDS process having an initial operating temperature of about 650° F. will reduce the sulfur level to about 1 percent in the effluent oil. In a given novel process of the invention, however, initial continuous operation at or near the aforementioned constrain temperature of 790° F. will reduce the sulfur content of the effluent oil to about 0.2 percent. Thereafter, according to the invention the sulfur content of the effluent oil rises slowly throughout the major portion of the normal length of catalysts cycle. The constant operating temperature should at least be within 20, 30 or 40° F. of the constraint temperature of 790° F., i.e. at least about 750° F.

Shortly before the end of the catalyst cycle as used in a conventional or control process, the process of the invention reaches the aforementioned constant or constraint temperature, for the balance of the catalyst cycle. Although the instantaneous sulfur content of the effluent oil rises above the stipulated 1 percent sulfur level, the average sulfur content of the effluent oil throughout a catalyst cycle of this invention is surprisingly only slightly over half that of the conventional process and the catalyst cycle of the present invention is equal in duration to the conventional catalyst cycle. This is indeed a startling development of a completely unexpected nature, which has been masked by conventional HDS process operation wherein it was thought necessary to maintain the sulfur level of the effluent constant and to permit the process temperature to rise for this purpose. The discovery of the invention has been further masked by what was previously thought to be the necessity of avoiding the process constraint temperature as long as possible.

A second advantageous result of the invention is the unexpected manner in which the catalyst life can be prolonged by another mode of operation of the invention. As noted heretofore, the invention is based upon the discovery that the HDS catalyst is not completely deactivated when the constraint temperature is reached or when a predetermined sulfur level in the effluent is attained in the manner outlined in the previous paragraph. Thus, in contrast to conventional processes, the process of the invention can be operated for a considerable time interval beyond the point at which the constraint temperature would be reached in a conventional HDS process. At this point the conventional process must be terminated; otherwise the process temperature would have to be increased to maintain the same sulfur level or the sulfur level would have to increase if the process temperature were not permitted to increase further. In the process of the invention, however, the sulfur level of the effluent oil can be permitted to increase further while maintaining the catalyst temperature at the same constant or constant temperature, as employed throughout the novel HDS process. Assuming again that a predetermined sulfur level of 1 percent is stipulated, the averaged or blended sulfur level in the effluent oil throughout a period corresponding to a conventional catalyst cycle is slightly over one-half the stipulated sulfur level. Thereafter, in accordance with this feature of the invention, the HDS process is operated for a further period at a rising effluent sulfur level in excess of the stipulated level until the averaged sulfur content of the total effluent throughput the extended catalyst cycle of the invention equals the stipulated sulfur level. The process temperature is, as noted above, maintained constantly at or near the constraint temperature both during the first stage of the catalyst cycle, when the sulfur level is below the stipulated level, and during the latter stage of the process, when the instantaneous sulfur level exceeds the stipulated sulfur content. The latter stage of the HDS process can be continued until the integrated excess of sulfur content above the stipulated level is equal to the integrated decrease in sulfur content below the stipulated level during the initial stage of the process. By blending or mixing the total effluent obtained after the rising sulfur content equals the stipulated sulfur content with the total effluent obtained during the initial stage of the process before the rising sulfur level reaches the stipulated sulfur level, the averaged sulfur content thus obtained will then equal the stipulated level. In the HDS process according to this feature of the invention, the life of the catalyst is thereby extended considerably by operation of the process at a constant elevated temperature or near the constraint temperature throughout the entire catalyst cycle, i.e. above 700° F. or about 770 to 790° F. It will be evident from the figure described below, that the life of the catalyst will not be doubled as the curve of rising sulfur content has a steeper average slope in the latter stage of the catalyst cycle than that prevalent during the initial or preliminary stage of the cycle.

As in the previous mode of operation, whereby the average sulfur content of the effluent oil is very nearly halved in comparison to the conventional HDS process, the novel HDS process according to this feature of the invention can be carried out without modification of conventional reaction vessels and associated equipment. The unexpected prolongation of the catalyst cycle possible with the discoveries of the present invention likewise hitherto have been masked by the intent to avoid the aforementioned constraint temperature as long as possible throughout the entire duration of the conventional HDS cycle.

From the previous discussion, it will be apparent that the present invention can be practiced in an especially advantageous manner by operating a plurality of reactors at the same time, with each at a different stage of catalyst deactivation so that at a given time each is capable of producing a different sulfur level effluent while operating at the constraint temperature. By continuous effluent blending any desired sulfur level total product is continuously obtained without requiring storage tanks for unblended product. In this embodiment, at least two reactors are required with one reactor at an early stage of the cycle and the other at a late stage in the cycle. The reactors are arranged in parallel.

Summarizing the discoveries of the invention as enumerated thus far, it has been found that operation of the HDS process at or near the process constraint temperature, using conventional equipment, can reduce the sulfur content of the total effluent oil to almost half that of a comparable conventional HDS process. Similarly, operation at the aforementioned constraint temperature, again using conventional equipment, can prolong the catalyst life by approximately 40 percent while maintaining the same averaged sulfur level in the total effluent oil. In the latter modification of the invention, then, the throughput of the reaction vessel for a single catalyst charge is likewise increased by about 40 percent. This advantageous result of this form of the process is enhanced still further by production increases resulting from less frequent catalyst changes and attendant reactor shutdowns.

Although best results are achieved by operating at the constraint temperature, the improved results of this invention are also achieved by operating a portion of the cycle at a constant temperature above that which will produce the desired effluent sulfur level but below the constraint temperature.

A third result of the present invention, is a very significant increase in catalytic cracking of the feed oil during the improved HDS process. It is known, of course, that catalytic cracking of crude oil or reduced crudes becomes significant with operating temperature of the order of 800° F. At these temperatures a significant amount of the charge oil can be cracked to lighter and hence more valuable components, such as lower boiling gasoline, gas oil, kerosine, and fuel or furnace oil. Lighter fuel oils naturally are a more valued product and their by-product appearance in any HDS process is nearly always welcomed. Previous HDS processes, however, produced only relatively minor amounts of cracked furnace oils, as only a very small portion of the duration of the catalyst cycle is operated at temperatures approaching the lowest, feasible catalytic cracking temperatures. In marked contrast to the prior processes, the HDS process of the invention is operated throughout the entire catalyst cycle at a temperature at which a significant amount of the catalytic cracking occurs. Thus, a significant quantity of the feed oil (about 10 percent by volume in the case of a reduced crude oil charge) is catalytically cracked to lighter components in contrast to prior HDS processes wherein virtually negligible amounts of the charge oil is catalytically cracked.

During the foregoing discussion, various objects, features and advantages of the invention have been set forth. These and other objects, features and advantages of the invention together with operational details thereof will be elaborated upon during the forthcoming description of certain presently preferred embodiments of the invention and presently preferred methods of practicing the same.

The drawing is a graphical representation contrasting the effects of constant and varying operating temperatures in novel and conventional HDS processes, particularly upon the catalyst aging characteristics, sulfur level, and throughputs thereof.

The drawing represents more particularly the unexpected character of the several features of the invention. In the drawing, the catalyst life cycle in days is plotted against the sulfur content of the effluent oil in terms of weight percent at the left margin. For the curves using this margin, the operating temperature is maintained constant throughout the catalyst cycle. The catalyst cycle in days also is plotted against increasing temperatures at the right-hand margin of the figure. Curve X represents what can be conveniently termed a two-stage process of the invention carried out in accordance with the invention and at constant temperature. Curve Y on the other hand is included for purposes of comparison and represents a conventional HDS process carried out in the same equipment at a variable temperature. In the conventional process (Curve Y) the effluent sulfur content is maintained at a constant, stipulated level, in this case 1.0 weight percent.

In the process of the invention, represented by curve X, the constant operating temperature policy produces a varying effluent sulfur content. Curve Z likewise is a graphical representation of a conventional HDS process corresponding to curve Y, and demonstrates the inability of the conventional HDS process to maintain the prescribed sulfur content when the constraint temperature is reached at point F. The rising part of the curve Z denoted by Z' shows the sharp increase in sulfur content which commences in the conventional process when the constraint temperature is reached which cannot be exceeded thereafter without undue reactor metals fatigue and personnel hazard.

The hydrodesulfurization process of this invention can employ reaction conditions such as, for example, a hydrogen partial pressure of 1000 to 5000 lbs. per square inch generally, 1000–3000 p.s.i. preferably, and 1500 to 2500 p.s.i., most preferably. In a particular case a hydrogen pressure of 1750 to 1850 p.s.i. can be employed. Reactor design limitations usually restrict inlet pressures to not more than 2000, 2500 or 3000 p.s.i. It is the partial pressure of hydrogen rather than total reactor pressure which determines hydrodesulfurization activity. Preferably, then, the hydrogen stream is as free of other gases as possible. By the same token, the hydrogen pressure drop across the reactor should be minimized, preferably not greater than about 100 p.s.i.

The gas circulation rate can be between about 2000 and 20,000 standard cubic feet per barrel of feed oil generally or preferably about 3,000 to 10,000 s.c.f. per barrel. The gas should contain 85 percent or more of hydrogen. The mol ratio of hydrogen to oil can be between about 8:1 and 80:1. Reactor temperatures in conventional processes can range between about 650 and about 790 degrees F. generally and between 680 and 790 degrees F. preferably. At temperatures approaching 800° F., the steel of the reactor walls rapidly losses strength, as noted previously, and unless reactor wall thicknesses of 7 to 10 in. or more are utilized a temperature of about 790° F. constitutes a process constraint. The liquid weight hourly space velocity can be between about 0.2 and 20 generally, between 0.4 and 10.0, preferably or between 0.7 and 2.0, most preferably.

The catalyst employed in the process is conventional in composition and comprises sulfided Group VI and Group VIII metals on a suitable support such as alumina. The process is preferably carried out with a catalyst having particles considerably smaller than the diameter of the HDS catalyst particles of the prior art, as described in the aforementioned copending application Ser. No. 770,625. Accordingly, the diameter of the catalyst particles desirably is between about $\frac{1}{20}$ and $\frac{1}{40}$ inch, preferably between $\frac{1}{25}$ and $\frac{1}{36}$ inch, and more preferably between about $\frac{1}{29}$ and $\frac{1}{34}$ inch as set forth in application Ser. No. 770,625. The catalyst can be prepared so that nearly all, i.e. at least about 92 or 96 percent of the particles are within the desired range of the invention.

The HDS processing of the crude and residue oils shows that a significant decrease in the sulfur level of the effluent oil is made possible by maintaining the catalyst beds in an HDS reactor at or near the maximum temperature. The figure illustrates and compares the operational processes of the invention with conventional practices. As noted previously, in conventional HDS processes the operating temperature is raised to counterbalance the decrease in the desulfurization reaction rate brought about by metals deposition on the catalyst particles, which lowers catalyst activities. However, the desulfurization rate exhibits an activation energy which is considerably higher than for demetalization of the feed oil. Hence, higher temperatures lead to higher relative desulfurization rates compared to demetalization rates.

Therefore, by operating at high temperature in accordance with this invention, a high degree of sulfur removal is achieved at a temperature at which metals removal is relatively less favored so that the ratio of sulfur removal to metals deposition is relatively high. On the other hand, by operating at low temperatures the degrees of sulfur removal is lower while metals removal is relatively more favored so that the ratio of sulfur to metals removal is low. Therefore, at the high temperatures of this invention, sulfur removal is high and metals removal is low, both of which are favorable, the former to product quality and the latter to catalyst life. For example, under the conditions of the following examples, at a 790° F. operating temperature a 1 percent sulfur product contained 10 p.p.m. of nickel and vanadium while at 690° F. a 1 percent sulfur product contained only 5 p.p.m. nickel and vanadium, showing that at the lower temperature more metals were removed from the oil.

A number of actual and computer simulation tests were conducted, the surprising results of which are graphically illustrated in the drawing. A 50 percent reduced Kuwait crude containing four weight percent (4 wt. percent) sulfur and 72 p.p.m. of total metals, primarily nickel and vanadium, was hydrodesulfurized to a product containing 1 percent sulfur by weight. A NiCoMo on alumina as 1/32 inch particles was employed as the HDS catalyst. The inspections of the charge material are given in the following table:

TABLE I

| | Charge |
|---|---|
| Gravity, ASTM D287: API | 15.7 |
| Viscosity, SUV: SEC.: | |
| 100 F. | 4906. |
| 210 F. | 171.8 |
| Carbon, wt. percent | 84.52 |
| Hydrogen, wt. percent | 11.43 |
| Nitrogen, total, wt. percent | 0.20 |
| Sulfur, wt. percent | 4.06 |
| Carbon residue, RAMS: wt. percent ASTM 0524 | 8.16 |
| Metals, p.p.m.: | |
| Nickel | 17.0 |
| Vanadium | 54.0 |
| Distillation, ASTM D1160 ° F. Corrected to 760 mm. Hg, percent: | |
| 5 | 608 |
| 10 | 674 |
| 20 | 762 |
| 30 | 829 |
| 40 | 888 |
| 50 | — |

Throughout the test and comparison runs, the resuts of which, including both a conventional process and the novel processes of the invention, an equipment limitation of 790° F. maximum average catalyst temperature was imposed. When this temperature was obtained during the comparison or conventional process, the catalyst was considered to be spent and the catalyst cycle was terminated in accordance with conventional operation. On the other hand, throughout the HDS processes of the invention, the maximum average catalyst temperature was maintained ab initio. That is to say, the processes of the invention were run continuously at or near the aforementioned equipment constraint temperature. The product inspections for the conventional process are given in the following table:

TABLE II

| Run | 1 | 2 | 3 | 4 | 5 |
|---|---|---|---|---|---|
| Gravity, ASTM D287: API | 20.7 | 20.7 | 20.7 | 20.8 | 20.8 |
| Viscosity, SUV, sec.: | | | | | |
| 100 F | 2,076 | 1,745 | 1,725 | 1,770 | 1,545 |
| 210 F | 113.0 | 106.8 | 104.7 | 100.9 | 99.1 |
| Carbon, wt. percent | 85.62 | 86.10 | 86.70 | 86.43 | 86.58 |
| Hydrogen, wt. percent | 12.00 | 12.03 | 11.83 | 12.23 | 11.92 |
| Nitrogen, total wt. percent | 0.17 | 0.18 | 0.18 | 0.18 | 0.18 |
| Sulfur, wt. percent | 1.11 | 1.05 | 1.11 | 1.06 | 0.98 |
| Carbon residue, RAMS: wt. percent, ASTM D524 | 5.17 | 5.15 | 5.07 | 4.90 | 4.77 |
| Metals, p.p.m.: | | | | | |
| Nickel | 5.0 | 5.1 | 5.1 | 4.5 | 4.0 |
| Vanadium | 7.4 | 6.9 | 7.2 | 6.9 | 6.9 |
| Heat of combustion, D240: G, B.t.u./lb | 19,021 | 19,053 | 19,030 | 19,040 | 19,062 |
| Distillation, ASTM D1160 F corrected to 760 mm. Hg: | | | | | |
| 5 percent | 651 | 646 | 632 | 634 | 641 |
| 10 percent | 687 | 681 | 669 | 669 | 693 |
| 20 percent | 755 | 751 | 747 | 734 | 747 |
| 30 percent | 812 | 797 | 802 | 786 | 810 |
| 40 percent | 866 | 855 | 858 | 843 | 866 |
| 50 percent | 930 | 917 | 917 | 917 | 933 |
| 60 percent | 1,000 | 1,000 | 987 | 989 | 987 |

For the several processes illustrated in the accompanying figure, a one percent by weight (1 wt. percent) effluent sulfur level is assumed for the purposes of illustration only. Obviously, the sulfur level in the effluent oil can be varied depending upon requirements of the end product, and in certain areas of the world, upon the provisions of local codes which may, of course, trend downward within the foreseeable future. Generally, the same considerations will apply irrespective of a particular predetermined sulfur level and, by the same token, the relative shapes of the several curves of the figure will be similar. In general and as might be anticipated, the several curves of the drawing would be expanded rightward (i.e. toward longer catalyst life cycles) as viewed in the drawing for effluent sulfur levels greater than 1 weight percent and would be compressed generally to the left for weight percents of less than 1 percent. The life cycle of the HDS catalyst thus would be lengthened for the sulfur contents above 1 percent and correspondingly foreshortened for sulfur contents below 1 percent.

The catalyst employed in these tests and in the comparison tests is a 1/32 inch NiCoMo on alumina containing on a weight basis 0.6 percent Ni, 1.1 percent Co and 7.9 percent Mo.

The data for the drawing were obtained from an experimental run and from simulations based on a kinetic model formulated from experimental and conventional operating data. The invention involves only changes in operational procedures and philosophy rather than changes in existing process equipment.

EXAMPLE I

For this modification of HDS process, according to the invention, the typical Kuwait reduced crude described previously was employed. In the operation of the conventional process, a cycle life of 215 days was noted as evident from curves Y and Z of the figure. That is to say, a period of 215 days was required for the average catalyst bed temperature to reach the constraint temperature of 790° F., while maintaining a 1 weight percent sulfur level, as stipulated. In the conventional process, as evident from curve Y, the operating temperature is maintained as far below the constraint temperature of 790° F. as is possible at a given space velocity while still maintaining a constant 1.0 percent sulfur level in the effluent oil. Thus, in the comparison run (curve Y) the conventional HDS process is commenced with an average catalyst bed temperature of about 650° F. Throughout the catalyst cycle the operating temperature must be increased in order to maintain the stipulated 1 percent sulfur level until the constraint temperature is reached at point F on curve Y. Point F, then, denotes the termination of the conventional catalyst cycle, as the operating temperature thereafter would have to rise above the constraint temperature of 790° F. as denoted by the Y' portion of the Y curve. Such continued operation, however, becomes hazardous at temperatures above 790° F.; therefore, the conventional catalyst cycle terminates at point F, with a cycle life of 215 days as aforementioned.

Curve Z relating also to the conventional or comparison run, shows that a constant sulfur content can be maintained in the effluent oil throughout the normal or conventional catalyst cycle of 215 days. That portion of the curve Z between points I and F shows that the rising operating temperature is able to maintain the effluent sulfur content at 1.0 percent as stipuated for this example. However, when point F is obtained the sulfur content in the effluent commences to rise along the Z' portion of the curve Z as the process temperature cannot be permitted to increase further as denoted by the chain line Z'' extension of the curve Z. Inasmuch as the sulfur content of the conventional process can no longer be maintained at the stipulated level the conventional catalyst cycle must be terminated at point F, in this case after 215 days' operation.

For the purpose of describing Example I, only that portion of curve X between points B and G will for the moment be considered. The region B-G of curve X represents the significant and unexpected improvement in the HDS process wrought by this modification of the invention. As evident from this figure, curve X is isothermic involving a constant process temperature in accordance with the invention, in this case the aforementioned 790° F. At operational temperatures above this point, for the particular reaction equipment employed in this example, reactor metals fatigue occurs causing damage to the equipment and hazard to operating personnel. On the other hand, for the same equipment, it has been found that the equipment can be subjected indefinitely to an average catalyst temperature of 790° F., i.e. the constraint temperature, without equipment damage or personnel hazard.

For the conventional HDS process, then, the catalyst life essentially is terminated at point F on curve Y. In the conventional mode of operation, the life of the catalyst can be extended only by tolerating a higher sulfur level in the effluent. This, however, is contrary to the basic assumption environmental to the comparative analysis as depicted graphically in the figure. In accordance with the example of the invention the first 215 days of operation of the process of the invention; (points B-G, curve X) will be considered in contrast to the conventional, control process (points A-F, curve Y). Thus, the 215 days of conventional operation is taken as a standard, as the effluent sulfur level would have to rise above the stipulated 1 percent by weight in order to avoid exceeding the constraint temperature, in this case 790° F., over a longer period of conventional operation.

In the process of the invention the average catalyst bed temperature is raised initially to the assumed constraint temperature of 790° F. Thereafter, this constraint temperature is maintained constantly at 790° F. throughout the 215 day catalyst cycle of this example. With this constant operating temperature it is found that the initial sulfur level in the effluent oil is a mere 0.2 percent by weight, and thus is considerably below the stipulated sulfur level on which this example is based. Thereafter, the effluent sulfur content rises comparatively slowly for the first 90 days of operation until a level of only about 0.4 weight percent is obtained as denoted at point B' on curve X. From point B', the isotherm X continues to rise with increasing slope until the instantaneous sulfur content equals the stipulated sulfur content of 1.0 weight percent at point E on curve X. From the figure it will be seen that point E corresponds to a catalyst life, according to the invention, of 185 days, and this is only 30 days short of the conventional catalyst life of 215 days as established by the conventional curve Y.

Naturally the average sulfur content of the total effluent produced thus far (point E) by the conventional HDS process (curves Y and Z) is the stipulated 1.0 weight percent. On the other hand and in contrast, it is one of the entirely unexpected results of the invention that the average sulfur level of the total effluent produced during the first 185 days operation of the HDS process of the invention is considerably less. In point of fact, upon integrating the area under that portion B-E of the curve X it is found that the average sulfur content in the total effluent oil is less than fifty percent (50 percent) of that produced by the conventional process.

At this point it is noteworthy to observe that the present invention has particular utility in increasing the capacity of an existing HDS unit as utilized for the comparison or conventional process typified by the curves Y and Z. It will be assumed that the existing HDS unit is in operation to reduce the sulfur content of a feed oil from 4 weight percent to 1 weight percent, but that a new local regulation or a new specification of some sort required that the effluent oil contain only 0.55 percent sulfur. The HDS process of the present invention permits the new regulation or requirement to be met with no change in the physical make-up of the HDS unit and permits the existing unit to meet the new sulfur level requirement by operation at a constant elevated temperature in accordance with the invention. For the assumed case the new HDS process can even surpass the new requirement, if the catalyst life is foreshortened to 185 days as denoted at point E in the figure. This result attains although the HDS unit is operated in accordance with the invention and in the latter portion of the 185 days cycle (points B''-E) at greater than the 0.55 percent sulfur requirement. The requirement is more than met by retaining and mixing the total effluent (point B-E of curve X) to achieve an averaged sulfur level, of which is decidedly less than the newly stipulated 0.55 percent.

It is noteworthy that the aforementioned new requirement can be exactly met with the HDS process of the invention by continuing the disclosed HDS process for an additional 30 day period in order to achieve that same throughput and cycle life (215 days, point F) as that of the conventional process (curve Y). Thus, by continuing the operation of the novel process from point E to point G along the isotherm X, the same throughput is obtained with the inventive process as was obtained by the comparison or conventional process. When the area under the portion B-G of the curve X is integrated it is found that the average sulfur content is 0.55 weight percent which precisely meets the new requirement as stipulated above. This unusual result attains even through the instantaneous sulfur content of the effluent during the last 30 days (points E-G) of the 215 day cycle of the invention is in excess of the originally stipulated 1.0 weight percent. Therefore, as discussed preliminarily, the advantageous result of this feature of the invention is an improved HDS process which is capable of utilizing existing equipment without modification and capable of producing an identical throughput, but with an averaged sulfur level of only slightly above one-half of that produced by the conventional process.

EXAMPLE II

In this example of the invention the same feed, product, and catalyst specifications are employed as set forth in the preceding tables. Here again a process constraint temperature of 790° F. is assumed, together with a stipulated averaged sulfur level of 1.0 weight percent in the effluent oil. A 50 percent Kuwait reduced crude is employed having an initial sulfur content of 4.0 weight percent. This comparison or conventional HDS process represented by curve Y is operated as in the preceding example for a catalyst cycle of 215 days after which the catalyst charge must be removed and replaced. This necessitates shutting down the reactor unit to permit loading of new catalyst after the 215 days period. As noted previously the conventional process must be terminated at point F in order to maintain an average sulfur content equal to the stipulated sulfur level in the effluent oil without exceeding the constraint temperature.

In contrast, the HDS process of the invention which is isothermic as before is operated persuant to this example of the invention for a considerable period beyond the 215 day conventional cycle. According to this feature of the invention, when employing the foregoing conditions, the life of the catalyst can be extended about 40 percent beyond the conventional catalyst life or to a period of about 300 days. In consequence the total throughput when employing the novel HDS process can be increased from about 4630 pounds of charge oil per pound of catalyst to about 6475 pounds of charge oil per pound of catalyst. This represents a remarkable increase in total throughput (about 40%) as a result of the novel HDS process. Moreover, the space velocity of the reactants can be maintained constant. The productivity of the HDS unit is enhanced still further by the necessity for reloading catalyst at less frequent intervals.

For the conventional HDS process (Curves Y and Z), averaging of the sulfur content would be meaningless as the sulfur content intentionally has been maintained heretofore as close to the stipulated sulfur level as possible throughout known conventional processes. Inasmuch as the novel HDS process according to the invention commences with an initial instantaneous sulfur content which is considerably below the stipulated level, the catalyst cycle can be extended, again in accordance with the invention, considerably beyond the point E where the instantaneous sulfur level equals the stipulated sulfur content, in this case 1.0 weight percent. Although the curve X exhibits a continuous and rising slope after the stipulated sulfur level is attained (point E) the novel HDS process can be continued in extension of the catalyst life cycle until point C of the figure is attained, at which time the catalyst cycle of the invention is terminated.

The terminal point C is determined by that amount of effluent oil containing more than the stipulated sulfur level which can be blended with the effluent oil containing less than the stipulated sulfur level to achieve a total blended throughput from a single, extended catalyst cycle (points B–C of curve X) containing an averaged sulfur content equal to the stipulated sulfur level. In this manner, as noted above, the total throughput and the extended catalyst cycle of the invention can be increased to a considerable extent, while maintaining a constant temperature at the constraint temperature, in this case 790° F. This is owing to the fact that the initial stage (points B–E) of the novel process produces an averaged effluent sulfur content which is well below the stipulated sulfur level, in this case 1.0 weight percent. As noted in connection with Example I, the portion B–E of the curve X produces an averaged sulfur content of less than 0.5 percent in the effluent oil. Accordingly, the catalyst cycle life of the invention can be extended considerably beyond point E and also beyond point G of curve X, which denotes a catalyst cycle of 215 days, equal in duration to the conventional catalyst cycle (point F, curve Y). Thus, curve X representing the isothermic operation of the invention at the constraint temperature can be extended to point C producing in this case a catalyst cycle having a duration of about 300 days in contrast to the conventional catalyst cycle of 215 days. The averaged sulfur content of the total throughput of effluent oil, produced in the latter stage (points E–C, curve X) of the extended catalyst cycle is such as to exactly counterbalance the average sulfur content produced during the first stage thereof (points B–E).

That is to say, while the averaged sulfur level of that portion of the throughput produced during the last 115 days (points E–C) of the novel catalyst cycle may exceed the stipulated sulfur level to a greater degree than the stipulated level (1.0 wt. percent) exceeds the averaged sulfur level of the first 185 days' throughput, obviously a weighted average must be considered. This can be ascertained by determining the point C terminus of the novel catalyst cycle such that the area C D E, i.e. the area between the E–C portion of curve X and the stipulated sulfur level (curve Z and line Z″) must equal the area between the first stage (portion B–E of curve X) and the stipulated sulfur level represented by curve Z, i.e., the area I B E. Accordingly, the terminus of the novel catalyst cycle in this example about 300 days, can readily be found from a process plot of the instantaneous or daily sulfur content, such as represented by curve X. In operation, from a graph such as curve X of the figure the novel process of this example of the invention is terminated when the area C D E relative to the latter cycle stage equals the area I B E. When the novel process is thus terminated the total amount of product (points E–C) containing more than 1.0 weight percent sulfur is blended with the total amount of product (points B–E) containing less than 1.0 weight percent sulfur to achieve a total blended product having not more than the stipulated sulfur level.

As in the preceding Example I, the total throughput available from a given catalyst charge can be thus increased while attaining the same stipulated sulfur level in comparison with the conventional control process of the figure without making any physical change in the reactor unit. The efficiency of the reactor unit therefore can be increased significantly and unexpectedly, in accordance with the invention, without altering the size of the reactor unit or the space velocity of the reactants. It will be seen then from the preceding examples that the novel HDS process, according to one alternative mode of operation, can provide an averaged sulfur content in the effluent oil of about half that of the conventional process without modification in process equipment (Example I). On the other hand, and likewise without equipment modification, the total throughput and the catalyst life can be considerably and unexpectedly enhanced by operation of the novel HDS process to produce the same stipulated sulfur level, as in the analogous conventional process.

EXAMPLE III

By the same token a combination of the beneficial results of the preceding examples can be obtained according to a third mode of operation of the invention. In this example, the same reactor unit, and the same stipulated sulfur level, and feed oil, product and catalyst inspections are employed. In this case the novel catalyst cycle is terminated arbitrarily at some point C′ intermediate the terminus (point C) of the novel catalyst cycle and point G corresponding to the length of the conventional catalyst cycle (point F), in this case 215 days. In this example, the novel HDS process is terminated at 270 days at which time the averaged effluent sulfur content obviously is less than the stipulated 1.0 percent, since the area C′ D′ E of the second stage (points E–C′) obviously is less than the area I B E of the initial stage (points B–E). It is the unexpected result of this example of the invention that the total throughput of the catalyst cycle (points B–C′) is increased by about 25 percent, i.e., from 215 days to 270 days at constant space velocity, while at the same time the averaged sulfur level of the total throughput of this example is still less than the stipulated 1.0 weight percent. In this example, the averaged sulfur content of the total effluent oil, as determined by the area under that portion B-C prime of curve X is only 0.87 percent.

Similarly other points along curve X can be selected as terminal points in determination of the catalyst life cycle of the invention depending upon the particular level of effluent sulfur for a given application. For example by terminating the catalyst cycle of the invention after 90 days (point B′) an averaged sulfur level of only 0.3 weight percent can be achieved. Here again, no modification of the conventional reactor unit is required.

We claim:
1. A process for hydrodesulfurizing a crude oil or a residual oil in at least two reactors in parallel, each of said reactors containing a NiCoMo on alumina support hydrodesulfurization catalyst in order to obtain a total desulfurized oil product having a specified maximum sulfur level, said process comprising the steps of passing hydrogen and said oil through said reactors in parallel streams thereof, operating each of said reactors at a temperature throughout said process such that during an early stage of the catalyst cycle therein a first product portion is provided having a varying sulfur level lower than said specified maximum sulfur level and such that during a later stage of said cycle a second product portion is provided having a varying sulfur level higher than said specified maximum sulfur level, maintaining at least one of said parallel reactors in said early cycle stage and the remainder of said parallel reactors in said later cycle stage so that the lower sulfur level of said one reactor in said early cycle stage counterbalances the higher sulfur level of the remainder of said reactors in said later cycle stage and so that an instantaneous product effluent of said one reactor in said early cycle stage upon admixture with an instantaneous product effluent of said remainder of said parallel reactors in said later cycle stage at any point throughout said process will result in a sulfur content in the combined instantaneous effluents of all of said reactors at or below said specified maximum sulfur level, and continuously combining said instantaneous product effluents throughout said process to obtain continuous and successive increments of said total product at or below said specified maximum sulfur level, whereby the life of the catalyst and total throughput of each of said reactors in said process are substantially increased, and whereby the total sulfur removed per unit weight of said catalyst in each of said reactors is increased.

2. The process of claim 1 wherein said temperature is above 750° F.

3. The process of claim 1 wherein said temperature is near 790° F.

4. The process according to claim 1 including maintaining a hydrogen partial pressure of at least 1000 p.s.i.

5. The process according to claim 4 including the modified step of establishing said hydrogen partial pressure within the range of 1500 p.s.i. to 2500 p.s.i.

6. The process according to claim 1 wherein said process has an upper constraint temperature, and said temperature is maintained substantially constant at or near said constraint temperature.

7. The process according to claim 1 wherein the liquid weight hourly space velocity is within the range of about 0.2 to 20, and the sulfur level of said total effluent is within the range of about 0.2 to about 1%.

8. The process according to claim 7 wherein said space velocity is within the range of about 0.7 to about 2.0, about 75 or 80% of the original sulfur content of said oil is removed, and the particles of said catalyst are between $\frac{1}{20}$ and $\frac{1}{40}$ inch.

9. The process according to claim 1 including the modified step of maintaining said temperature sufficiently high that a significant quantity of said oil is cracked during said hydrodesulfurizing process.

References Cited

UNITED STATES PATENTS

| | | | |
|---|---|---|---|
| 3,125,507 | 3/1964 | Tupman et al. | 208—216 |
| 3,162,597 | 12/1964 | Davis, Jr. et al. | 208—216 |
| 3,269,958 | 8/1966 | Gatsis | 208—216 |
| 3,563,886 | 2/1971 | Carlson et al. | 208—216 |
| 3,383,301 | 5/1968 | Beuther et al. | 208—216 |

DELBERT E. GANTZ, Primary Examiner

G. J. CRASANAKIS, Assistant Examiner

U.S. Cl. X.R.

208—78